United States Patent Office 3,575,870
Patented Apr. 20, 1971

3,575,870
CURING COMPOSITION OF POLYETHER AMINES AND BIS(4 - HYDROXYPHENYL)DIMETHYL-METHANE
Isao Shimoyama, Dallas, Tex.
(1018 Brookhollow Drive, Irving, Tex. 75060)
No Drawing. Filed Mar. 13, 1969, Ser. No. 815,244
Int. Cl. C08h 17/62
U.S. Cl. 252—182                              6 Claims

ABSTRACT OF THE DISCLOSURE

A curing composition comprising a polyether amine selected from the group consisting of polyoxypropylenediamines, polyoxypropylenetriamines and polyoxytetramethylenediamines, and bisphenol-A, a method of preparing said curing compositions, and curable compositions prepared from said curing compositions.

BACKGROUND OF THE INVENTION

The present invention relates to curing compositions for epoxy resins. More particularly, the present invention relates to curing compositions to produce epoxy coatings of improved properties.

Prior art polyepoxide coatings on floors, walls, etc., have often suffered from what is commonly referred to in the art as "amine blush." Amine blush is brought about by exudation of unreacted polyepoxide resin to the surface of the cured film and results in a surface that is tacky or possesses a greasy appearance. The problem of "amine blush" has been largely eliminated by the use of certain aliphatic polyether amines. Unfortunately, many of these polyether amines have extremely long cure times. This is a particularly undesirable characteristic when the epoxy based coatings are used as floor and wall coverings and in other such residential or commercial applications.

SUMMARY

It is therefore an object of the present invention to provide an improved curing composition for epoxy resins.

It is another object of the present invention to provide epoxy compositions which can be rapidly cured to provide coatings substantially free from amine blush.

In addition, it is another object of the present invention to provide epoxy compositions which can be utilized in castings or encapsulation processes.

These and numerous other objects of the present invention which will be apparent from the description of the present invention given herein and the appended claims are achieved by utilizing an improved epoxy resin curing composition comprising:

From about 99.5 to about 40% by weight of a polyether amine selected from the group consisting of diamines having the general formula

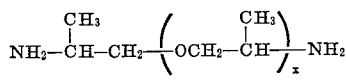

wherein $x$ is from 2 to 34 inclusive, triamines having the general formula

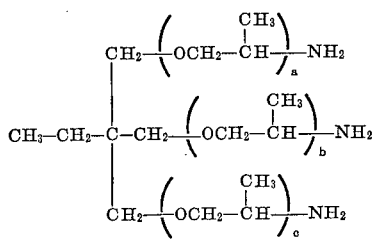

wherein $a+b+c=5.3$ inclusive, and diamines having the general formula $$NH_2\text{-}(C_4H_8O)_y\text{-}NH_2$$

wherein $y$ is from 8 to 140 inclusive; and from about 0.5 to about 60% by weight of bis (4-hydroxyphenyl) dimethylmethane.

In another embodiment, the present invention provides a curable composition comprising the above curing composition and a polyepoxide having an epoxide equivalent weight of greater than 150.

In still another of its embodiments, the present invention provides for a method of preparing an improved curing composition comprising heating in an inert atmosphere to a temperature of from 30 to 50° C. a polyether amine selected from the group consisting of diamines having the general formula

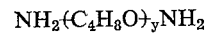

wherein $x$ is from 2 to 34 inclusive, triamines having the general formula

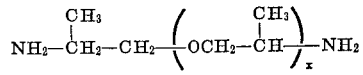

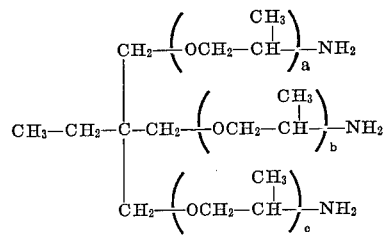

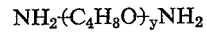

wherein $a+b+c=5.3$ inclusive and diamines having the general formula $$NH_2\text{-}(C_4H_8O)_y\text{-}NH_2$$

wherein $y$ is from 8 to 140 inclusive; adding an amount of bis (4-hydroxyphenyl) dimethylmethane to said polyether amine such that said polyether amine is present in an amount of from 99.5 to 40% by weight and said bis (4-hydroxyphenyl) dimethylmethane is present in an amount of from 0.5 to 60% by weight; agitating the mixture of said polyether amine and said bis (4-hydroxyphenyl) dimethylmethane at a temperature of from 70 to 80° C. until a solution is obtained; and cooling said solution.

DESCRIPTION OF THE PREFERRED EMBODIMENTS

In general the amines useful in preparing the improved curing compositions of the present invention all contain a polyether backbone. Polyether amines having the formula:

(Formula I) 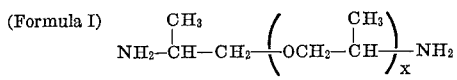

wherein $x$ is from 2 to 34 inclusive, are derived from polypropylene glycols. Those having the formula:

Formula II)

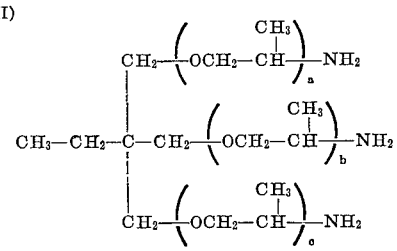

wherein $a+b+c=5.3$ inclusive are derived from polypropylene triols while those having the formula $$NH_2\text{-}(C_4H_8O)_y\text{-}NH_2$$

wherein $y$ is from 8 to 140 inclusive, are derived from a furfuryl base. The preferred polyether amines used in preparing the curing compositions are those exemplified by Formula I, particularly where $x$ is from 2–6 inclusive. Especially desirable for use in preparing polyepoxy floor and wall coatings is a polyether diamine of Formula I wherein $x=2.6$. The polyether amines exemplified by the above formulas can be prepared by amination of the respective polyol by techniques well known in the art.

The amount of the particular polyether amine in the curing compositions of the present invention may range from about 95 to about 50% by weight but more generally will be present in an amount of from about 92 to about 70% by weight.

In addition to the polyether amine, the curing compositions of the present invention contain from about 5 to about 50 and preferably from about 8 to about 30% by weight of bis(4-hydroxyphenyl) dimethylmethane, commonly known as bisphenol-A.

By adjusting the amount of bisphenol-A in the curing compositions herein, the cure time of the epoxy resin being hardened may be readily varied. Other hardening accelerators which have been suggested for use with the polyether amines of the present composition have, for the most part, proven unsatisfactory in that the cure time could not be varied over wide limits. Also undesirable coloring was imparted to the cured epoxy coatings by the use of other hardening accelerators. Both of the latter difficulties are substantially overcome by the use of bisphenol-A.

In preparing the curing compositions herein, it is necessary that certain precautions be observed to insure a satisfactory product. One precaution in particular that should be taken is that the preparation be carried out in an inert atmosphere such as a nitrogen blanket. Other inert gases such as methane, helium or argon can be employed but nitrogen is generally used. In general the curing composition is prepared by first heating the amine in a stirred vessel to between 30 to 50° C. When the proper temperature is reached, the solid bisphenol-A is slowly added and the temperature is raised to between 70 and 80° C. The temperature is then held in the 70 to 80° C. range and the mixture agitated until all of the bisphenol-A dissolves and a clear solution is obtained. Upon cooling the solution is ready for use. Since the solvation of the bisphenol-A by the polyether amine is a slightly exothermic reaction, it is best to carry out the preparation in a water jacketed vessel to insure that the temperature is controlled in the above specified range.

The curing compositions of the present invention can be used with virtually any of the known polyepoxide resins, to form infusible compositions having excellent properties. As well known in the art, these resins may be prepared by condensing epichloride with polyhydric alcohols or phenols for example, ethylene glycol, diethylene glycol, glycerol, diglycerol, catechol, resorcinol, a di(hydroxyphenyl)ethane, a di(hydroxyphenol)propane, etc. A preferred type of epoxy resin is that prepared by condensing epichlorhydrin with bisphenol-A.

Generally the polyepoxide resins preferred are those having an epoxide equivalent weight of greater than 150 and more preferably from 170 to 400. As is well recognized, the curing composition herein need be present with the polyepoxide only in a curing amount, i.e., an amount suitable to obtain an infusible product upon curing. More generally, however, the curing composition herein will be present in an amount of from 15 to 45% by weight, the particular polyepoxide resin being present in an amount of from 85 to about 55% by weight.

By varying the amount of the herein disclosed curing compositions used with the particular polyepoxide resin, it has been found possible to selectively vary the cure time from 1 hour to 4 days. Thus predictable cure times may be produced in relation to the ambient temperature at the locale where the work is being done.

Obviously other agents such as fillers, dyes, pigments, leveling agents, solvents, plasticizers, antifoamers, color stabilizers, thixotropes and the like can be added to either the curing compositions or to the polyepoxide resin cured by the former.

Curable epoxy compositions prepared using the curing compositions of the present invention are also excellent for use in moldings and encapsulations.

The invention is illustrated by the following examples which are not to be construed as a limitation on the scope thereof. All amounts are parts by weight unless otherwise indicated.

EXAMPLE

A series of curing compositions was prepared by mixing together in a reaction flask, equipped for heating and stirring, various amounts of a polyoxypropylene diamine (Formula I) of molecular weight 230, i.e. $x=2.6$ and bisphenol-A. In all cases a nitrogen purge was maintained above the mixture in the flask. Heat was applied until the temperature reached about 75° C. at which point it was maintained until a clear solution was obtained. The solution was then allowed to cool to room temperature. Table I shows the compositions of the various curing agents prepared:

TABLE I

| Composition | Amine | Bisphenol-A |
| --- | --- | --- |
| A | 25 | 0 |
| B | 24.6 | 1.5 |
| C | 24.4 | 2.6 |
| D | 24.1 | 3.6 |
| E | 23.8 | 4.8 |
| F | 23.2 | 7.0 |
| G | 21.7 | 13.1 |
| H | 19.2 | 23.1 |

All of the curing compositions were found to be stable when cooled to 0° F. or stored for prolonged periods at 120° F. The compositions retained their fluidity and curing properties.

The above curing compositions were used to prepare curable compositions using a polyepoxide resin of the epichlorohydrin-bisphenol-A type and having an epoxide equivalent weight of from 150–250. Table II shows the compositions of the curable compositions, the gel time thereof and the tack free time of film prepared therefrom.

TABLE II

| Curing compositions | Parts by weight | Polyepoxide resins, parts by weight | Gel time 250 gm. mass mixed at 77° F., minutes | Tack free time 20–30 mil film at 60° F., hours |
| --- | --- | --- | --- | --- |
| A | 25.0 | 75.0 | >100 | >72 |
| B | 26.1 | 73.9 | 65 | |
| C | 27.0 | 73.0 | 56 | 40 |
| D | 27.7 | 72.3 | 45 | 20 |
| E | 28.6 | 71.4 | 40 | 12 |
| F | 30.2 | 69.8 | 35 | 9 |
| G | 34.8 | 65.2 | 25 | 6 |
| H | 42.3 | 57.7 | 15 | |

As the data on Table II clearly shows (see gel time and tack free time) the use of the curing compositions of the present invention enables one to control the cure time within very close ranges.

That which is claimed and desired to be secured by United States Letters Patent is:

1. An improved epoxy resin curing composition comprising:

from about 99.5 to about 40% by weight of a polyether amine selected from the group consisting of diamines having the general formula

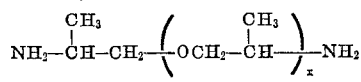

wherein $x$ is from 2 to 34 inclusive, triamines having the general formula

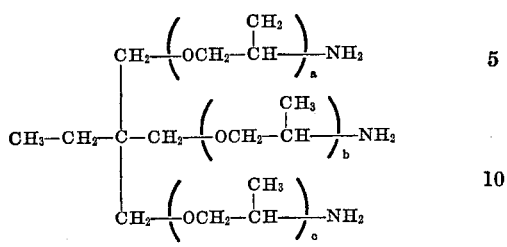

wherein $a+b+c=5.3$ inclusive and diamines having the general formula $$NH_2(C_4H_8O)_yNH_2$$

wherein $y$ is from 8 to 140 inclusive; and from about 0.5 to about 60% by weight of bis (4-hydroxyphenyl) dimethylmethane.

2. The composition of claim 1 wherein said polyether amine is present in an amount of from about 92 to about 70% by weight and siad bis (4-hydroxyphenyl) dimethylmethane is present in an amount of from about 8 to about 30% by weight.

3. The composition of claim 1 wherein said polyether amine is one having the formula:

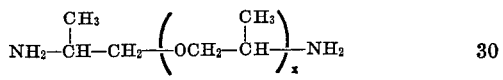

wherein $x$ is from 2–6 inclusive.

4. The composition of claim 3 wherein siad polyether amine is present in an amount of from about 92 to about 70% by weight and said bis (4-hydroxyphenyl)dimethylmethane is present in an amount of from about 8 to about 30% by weight.

5. The composition of claim 4 wherein said polyether amine is

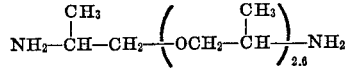

6. A method of preparing an improved curing composition comprising:
heating in an inert atmosphere to a temperature of from 30 to 50° C. a polyether amine selected from the group consisting of diamines having the general formula

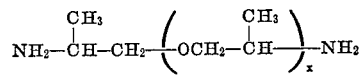

wherein $x$ is from 2 to 34 inclusive, triamines having the general formula

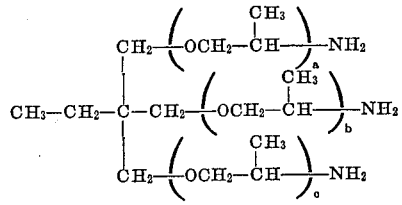

wherein $a+b+c=5.3$ inclusive and diamines having the general formula $$NH_2(C_4H_8O)_yNH_2$$

wherein $y$ is from 8 to 140 inclusive;
adding an amount of bis (4-hydroxyphenyl) dimethylmethane to said polyether amine such that said polyether amine is present in an amount of from 99.5 to 40% by weight and said bis (4-hydroxyphenyl) dimethylmethane is present in an amount of from 0.5 to 60% by weight;
agitating the mixture of said polyether amine and said bis (4-hydroxyphenyl) dimethylmethane at a temperature of from 70 to 80° C. until a solution is obtained;
and cooling said solution.

References Cited
UNITED STATES PATENTS

| | | | |
|---|---|---|---|
| 3,021,232 | 2/1962 | Pretka | 260—2 |
| 3,203,920 | 8/1965 | Nikles et al. | 260—2 |
| 3,236,895 | 2/1966 | Lee et al. | 260—2 |
| 3,306,809 | 2/1967 | Williamson et al. | 260—2 |
| 3,316,185 | 4/1967 | Reinking | 260—2 |

RICHARD D. LOVERING, Primary Examiner

I. GLUCK, Assistant Examiner

U.S. Cl. X.R.

260—2, 47